United States Patent
Zhou et al.

(10) Patent No.: US 7,344,591 B2
(45) Date of Patent: Mar. 18, 2008

(54) STABILIZED SUSPENSION OF TITANIUM DIOXIDE NANOPARTICLES AND METHODS OF MANUFACTURE

(75) Inventors: Bing Zhou, Cranbury, NJ (US); Sukesh Parasher, Lawrenceville, NJ (US); Zhihua Wu, Lawrenceville, NJ (US); Zhenhua Zhou, Lawrenceville, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 0 days.

(21) Appl. No.: 11/743,528

(22) Filed: May 2, 2007

(65) Prior Publication Data

US 2007/0199480 A1    Aug. 30, 2007

Related U.S. Application Data

(62) Division of application No. 11/106,831, filed on Apr. 15, 2005.

(51) Int. Cl.
*C09C 1/36* (2006.01)

(52) U.S. Cl. .................. 106/436; 106/437; 106/608; 423/610; 423/612; 428/702

(58) Field of Classification Search ........ 106/436–437, 106/608; 423/610, 612; 428/702
See application file for complete search history.

(56) References Cited

U.S. PATENT DOCUMENTS

| | | | |
|---|---|---|---|
| 4,701,428 A | 10/1987 | Bellussi et al. ................ 502/8 |
| 4,778,671 A * | 10/1988 | Wusirika .................. 423/592.1 |
| 4,824,976 A | 4/1989 | Clerici et al. ................ 549/531 |
| 4,923,682 A * | 5/1990 | Roberts et al. ............. 423/611 |
| 4,944,936 A * | 7/1990 | Lawhorne .................... 423/612 |
| 5,045,301 A * | 9/1991 | Chopin et al. .............. 423/610 |
| 5,214,168 A | 5/1993 | Zajacek et al. ............. 549/531 |
| 5,338,531 A | 8/1994 | Chuang et al. ............. 423/584 |
| 5,776,239 A | 7/1998 | Bruno ........................ 106/437 |

(Continued)

FOREIGN PATENT DOCUMENTS

EP    0 978 316    2/2000

(Continued)

OTHER PUBLICATIONS

Ahmadi, et al., "Shape-Controlled Synthesis of Colloidal Platinum Nanoparticles", *Science*, vol. 272, pp. 1924-1926 (Jun. 28, 1996).

(Continued)

*Primary Examiner*—J. A. Lorengo
*Assistant Examiner*—Pegah Parvini
(74) *Attorney, Agent, or Firm*—Workman Nydegger

(57) ABSTRACT

Titanium dioxide nanoparticles are formed using a dispersing agent to form nanoparticles with desired size, shape, and uniformity. The titanium dioxide nanoparticles are formed by reacting an inorganic titanium compound with water or ice to form an aqueous titanium compound. The aqueous titanium compound is reacted or combined with a dispersing agent. Titanium dioxide nanoparticles are precipitated to form a suspension. The formation of the titanium dioxide nanoparticles is influenced by the presence of bonding of the dispersing agent. The size of the nanoparticles can be advantageously controlled by selecting the ratio of titanium to dispersing agent. In addition, the titanium dioxide nanoparticles can be used in suspension form or filtered and dried to form a powder.

20 Claims, 6 Drawing Sheets

U.S. PATENT DOCUMENTS

| | | | | |
|---|---|---|---|---|
| 5,837,050 | A | 11/1998 | Okuda et al. | 106/439 |
| 5,840,111 | A | 11/1998 | Wiederhoft et al. | 106/436 |
| 5,846,511 | A | 12/1998 | Kim et al. | 423/610 |
| 5,846,895 | A | 12/1998 | Gila et al. | 502/107 |
| 5,846,898 | A | 12/1998 | Chuang et al. | 502/181 |
| 5,859,265 | A | 1/1999 | Muller et al. | 549/531 |
| 5,912,367 | A | 6/1999 | Chang | 549/529 |
| 5,925,588 | A | 7/1999 | Chuang et al. | 502/181 |
| 5,973,175 | A | 10/1999 | Bruno | 556/56 |
| 6,001,326 | A | 12/1999 | Kim et al. | 423/598 |
| 6,054,507 | A | 4/2000 | Funaki et al. | 523/210 |
| 6,090,858 | A | 7/2000 | El-Sayed | 516/97 |
| 6,127,307 | A | 10/2000 | Muller et al. | 502/162 |
| 6,159,267 | A | 12/2000 | Hampden-Smith et al. | 75/252 |
| 6,168,775 | B1 | 1/2001 | Zhou et al. | 423/584 |
| 6,187,438 | B1 | 2/2001 | Chopin et al. | 428/403 |
| 6,194,338 | B1 | 2/2001 | Andolfatto et al. | 502/101 |
| 6,306,361 | B1 | 10/2001 | Shin et al. | 423/610 |
| 6,329,058 | B1 | 12/2001 | Arney et al. | 428/403 |
| 6,432,526 | B1 | 8/2002 | Arney et al. | 428/328 |
| 6,440,383 | B1 | 8/2002 | Duyvesteyn et al. | 423/611 |
| 6,479,031 | B2 | 11/2002 | Ohmori et al. | 423/610 |
| 6,517,804 | B1 * | 2/2003 | Kim et al. | 423/610 |
| 6,528,683 | B1 | 3/2003 | Heidemann et al. | 562/542 |
| 6,534,661 | B1 | 3/2003 | Zhou et al. | 549/531 |
| 6,537,517 | B1 | 3/2003 | Kasuga et al. | 423/610 |
| 6,548,039 | B1 | 4/2003 | Duyvesteyn et al. | 423/610 |
| 6,576,589 | B1 | 6/2003 | Na et al. | 502/350 |
| 6,592,842 | B2 | 7/2003 | Elder et al. | 423/610 |
| 6,613,301 | B2 | 9/2003 | Jang et al. | 423/613 |
| 6,627,173 | B2 | 9/2003 | Hemme et al. | 423/598 |
| 6,635,348 | B1 | 10/2003 | Hampden-Smith et al. | 428/402 |
| 6,653,356 | B2 | 11/2003 | Sherman | 516/90 |
| 6,663,851 | B1 | 12/2003 | Deller et al. | 424/59 |
| 6,676,919 | B1 | 1/2004 | Fischer et al. | 423/584 |
| 6,685,909 | B2 | 2/2004 | Elder et al. | 423/598 |
| 6,740,615 | B2 | 5/2004 | Zhou | 502/29 |
| 6,746,597 | B2 | 6/2004 | Zhou et al. | 208/138 |
| 6,782,892 | B2 | 8/2004 | Li et al. | 131/364 |
| 2004/0013601 | A1 | 1/2004 | Butz et al. | 423/584 |
| 2004/0037770 | A1 | 2/2004 | Fischer et al. | 423/584 |
| 2004/0184983 | A1 | 9/2004 | Paparatto et al. | 423/584 |
| 2004/0241502 | A1 | 12/2004 | Chung et al. | 428/702 |

FOREIGN PATENT DOCUMENTS

| | | |
|---|---|---|
| JP | 9301705 | 11/1997 |
| JP | 2003024794 | 1/2003 |
| WO | WO 98/10863 | 3/1998 |
| WO | WO 02/83550 | 10/2002 |
| WO | WO 04078740 | 9/2004 |

OTHER PUBLICATIONS

Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective Hydrogenation Catalyst", *Chem. Mater.*, vol. 13, pp. 733-737 (Feb. 10, 2001).

Zhou, et al., "Novel Synthesis of Highly Active Pt/C Cathode Eectrocatalyst for Direct Methanol Fuel Cell", Chem. Commun. 2003, pp. 394-395.

Zhou, et al. "Preparation and Characterization of Anode Catalysts PtRu/C for Direct Methanol Fuel Cells", Chemical Journal of Chinese Universities, vol. 24, 2003, pp. 885-862.2003, pp. 885-862.

\* cited by examiner

STABILIZED SUSPENSION OF TITANIUM DIOXIDE NANOPARTICLES AND METHODS OF MANUFACTURE

CROSS-REFERENCE TO RELATED APPLICATION

This application is a division of copending U.S. application Ser. No. 11/106,831, filed Apr. 15, 2005, the disclosure of which is incorporated herein in its entirety.

BACKGROUND OF THE INVENTION

1. The Field of the Invention

The present invention relates generally to the manufacture of titanium dioxide nanoparticles and nanoparticle suspensions. In particular, the titanium dioxide nanoparticles and nanoparticle suspensions are made using a dispersing agent to influence the size, shape and/or stability of the nanoparticles.

2. The Relevant Technology

Titanium dioxide is used in a variety of applications including pigmentation, light blocking, UV absorption, antimicrobial, photocatalytic oxidation, optics, semiconductors, polymer fillers, ceramics, and others. In most of these applications, particular crystal structures and particle sizes are needed to provide the desired properties of the titanium nanoparticles. In some cases, particle sizes such as 3-4 nm are ideal for providing proper catalytic activity. In other cases, larger particles such as 10-100 nm or 100-200 nm are more desirable.

Crystal structure can also be important for obtaining desired function. Two commonly used crystal structures of titanium dioxide include anatase and rutile. Anatase is more rare. Titanium dioxide in the anatase crystal structure is often used as a photocatalyst. Examples of reactions that use the anatase crystal include photodecomposition of acetone, phenol or trichloro ethylene; oxidation systems of nitric oxide such as nitrogen mono-oxide and nitrogen dioxide; and conversion systems of solar energy. Titanium dioxide with the rutile crystal structure has been widely used for white pigment materials because of its good light scattering effect, which can protect against ultraviolet light. The rutile crystal has also been used for optical coatings, beam splitters, and anti-reflection coatings, since rutile has a high dielectric constant, high refractive index, good oil adsorption, tinting power, and chemical stability, even under strongly acidic or basic conditions.

Titanium dioxide is also used in humidity sensors and high temperature oxygen sensors. Titanium dioxide is particularly well suited for these industries because of its good chemical stability in the presence of water and its ability to exhibit different electrical characteristics as the partial pressure of oxygen varies.

While the use of titanium dioxide has become pervasive, its manufacture can be difficult and expensive. The difficulties and expenses often occur because of the need to form titanium dioxide particles with a particular size and shape. Because of the high surface energies associated with extremely small particles, there is a tendency for these particles to agglomerate and grow, such that the benefit of small and uniform particle size is lost.

Another problem with the titanium dioxide materials of the prior art is the inability to suitably stabilize suspensions of titanium dioxide nanoparticles. For many uses it would be desirable to have a stable suspension of nanoparticles that could be used days later, or preferably even weeks or months later. Existing titanium dioxide particles and solutions are often too unstable to be economically feasible for use in suspension form. Consequently expensive drying and reconstituting steps are needed to use many existing titanium dioxide products.

Therefore, what is needed are titanium dioxide nanoparticles with controlled particle size, shape, and/or stability and methods for economically producing these particles.

BRIEF SUMMARY OF THE INVENTION

The present invention overcomes the disadvantages of the titanium dioxide nanoparticles of the prior art by providing novel titanium dioxide compositions and novel methods of making titanium dioxide nanoparticles. The novel titanium dioxide nanoparticles and novel compositions are made by reacting an inorganic titanium compound with water to form an aqueous titanium compound. An organic dispersing agent is added to influence the size, shape, and/or stability of the titanium dioxide nanoparticles formed from the aqueous titanium compounds.

In an exemplary embodiment, the method of manufacturing titanium dioxide nanoparticles includes: (i) reacting an inorganic titanium compound with water or ice to form an aqueous titanium solution that is substantially free of a monofunctional alcohol; (ii) adding an amount of a dispersing agent to the aqueous titanium solution to form a precursor solution, wherein the dispersing agent comprises a plurality of organic molecules that have at least one functional group capable of binding to the titanium in the aqueous solution; and (iii) forming a plurality of titanium dioxide nanoparticles by holding the precursor solution at one or more temperatures until the nanoparticles form.

In this embodiment, forming the aqueous titanium solution without a monofunctional alcohol can be advantageous to prevent unwanted interactions between the monofunctional alcohol and the aqueous titanium compounds. Monofunctional alcohols have the potential to bind with titanium and form monofunctional-alcohol titanium complexes that have different chemical properties than the titanium compounds of the present invention. For example, monofunctional titanium compounds are less reactive and therefore less likely to interact with the dispersing agent.

According to another embodiment of the invention, titanium dioxide nanoparticles are manufactured by reacting an inorganic titanium compound with water or ice to form a titanyl compound. The titanyl compound is diluted and mixed with an organic dispersing agent having one or more functional groups that can bond with the titanyl compound. Titanium dioxide particles are then precipitated from the solution. Titanium dioxide nanoparticles formed using the dispersing agent have a more uniform shape, size, and/or are more stable than titanium nanoparticles formed without the use of a dispersing agent.

In one embodiment, the dispersing agent can be used to influence the average size of the titanium dioxide nanoparticles. In this embodiment, the molar ratio of titanium to dispersing agent molecules is selected to produce nanoparticles of a desired average size. In general, a titanium to dispersing agent molecule ratio of between about 0.01 to about 100, and more preferably between about 0.05 to about 20, can produce nanoparticles with average size between about 2 nm and about 200 nm.

According to another aspect of the invention, a titanium dioxide suspension is formed having titanium dioxide nanoparticles suspended in solution. The dispersing agent influences the formation of nanoparticles in solution to form nanoparticles that are uniform in size and shape.

These and other advantages and features of the present invention will become more fully apparent from the following description and appended claims as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1:
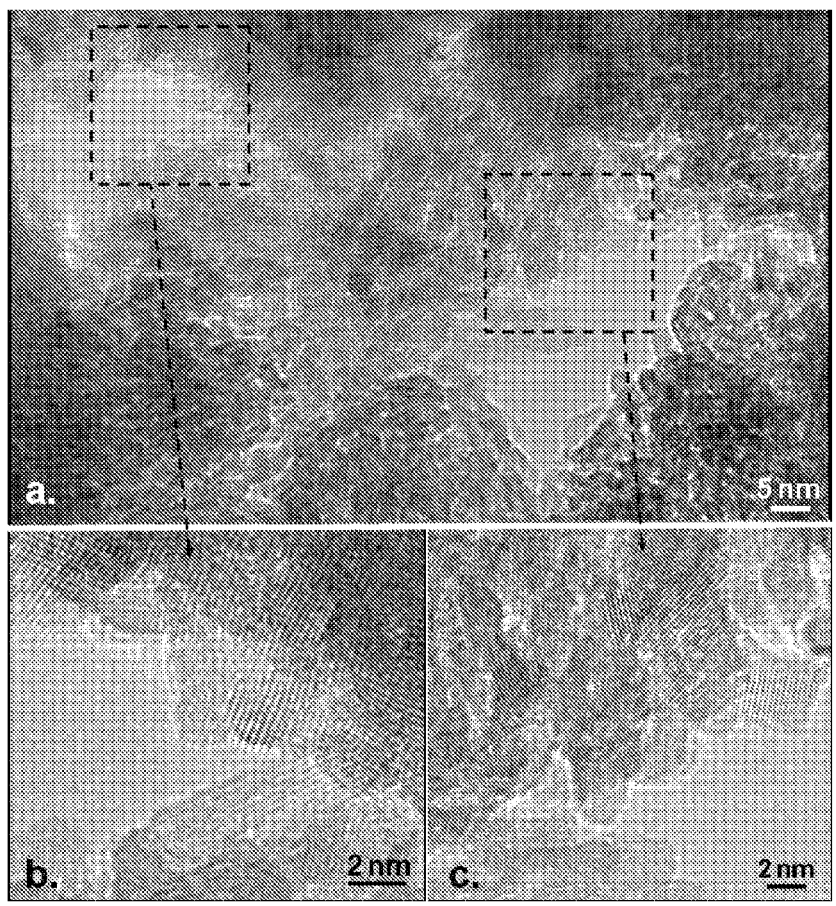
FIG. 1 is a high resolution transmission electron microscopy showing the size and shape of titanium dioxide nanoparticles made according to prior art methods.

I. Methods of Manufacturing Titanium Dioxide Nanoparticles and Nanoparticle Suspensions The present invention is directed to the manufacture of novel titanium dioxide nanoparticles and nanoparticle suspensions, as well as novel methods of making titanium dioxide nanoparticles and nanoparticle suspensions. The titanium dioxide nanoparticles and compositions are made using an organic dispersing agent to influence the size, shape, and/or stability of the titanium dioxide nanoparticles.

For purposes of this invention, the term "nanoparticles" or "nano-sized particles," means particles with a diameter of less than 1 micron.

In an exemplary embodiment, the method of manufacturing titanium dioxide nanoparticles includes: (i) reacting an inorganic titanium compound with water or ice to form an aqueous titanium solution, (ii) adding an amount of a dispersing agent to the aqueous titanium solution, wherein the dispersing agent comprising a plurality of organic molecules that have at least two functional groups capable of binding to the titanium in the aqueous solution, and (iii) forming a plurality of titanium dioxide nanoparticles by maintaining the solution of titanium and dispersing agent at a desired temperature.

A. Forming an Aqueous Solution of a Titanium Compound

An aqueous solution of a titanium compound is formed by reacting an inorganic titanium compound with water. Water may be used in any form, including liquid water and water ice. Inorganic titanium compounds include, but are not limited to, titanium tetrachloride ($TiCl_4$) and titanium sulfate ($Ti(SO_4)_2$).

The inorganic titanium compound can be reacted with water to form various different species of titanium compounds in solution. Most of the examples given below illustrate various titanium compounds that can be formed using titanium tetrachloride. Similar titanium compounds can be formed using other inorganic titanium compounds.

In an exemplary embodiment, water is reacted with a titanium compound to form hydroxy titanium compounds. Titanium tetrachloride reacts with water to form a hydroxy titanium compound according to the following reaction: $TiCl_4 + 4H_2O \rightarrow Ti(OH)_4 + 4HCl$. Incomplete reaction of titanium tetrachloride and water yields various hydroxy chloro species described by the following formula: $Ti(OH)_xCl_{4-x}$, where $1 \leq x \leq 4$. Other inorganic compounds such as $Ti(SO_4)_2$ can react with water to form analogous hydroxy titanium compounds.

In another embodiment, an inorganic titanium compound is reacted with water to form a titanyl compound (i.e. a compound that includes oxygen double bonded to titanium). The formation of a titanyl compound occurs according to the following reaction: $TiCl_4 + H_2O \rightarrow TiOCl_2 + 2HCl$. In a similar reaction, $Ti(SO_4)_2$ is reacted with water to form titanyl sulfate, $TiO(SO_4)$.

Forming a hydroxy titanium compound versus a titanyl compound can be controlled through reaction conditions. In general, the hydroxy chloro species forms when titanium tetrachloride is added to large amounts of water. In contrast, the titanyl compound can be formed by adding less than or equal to a stoichiometric amount of water to titanium tetrachloride.

The balanced chemical equations for the hydroxy and titanyl compounds reveals that formation of the hydroxy compounds requires 4 molar equivalents of water versus 1 molar equivalent to form the titanyl compound. Thus by controlling the amount of water reacted with the inorganic titanium compound the species of aqueous titanium compound that is formed can be controlled. Adding water slowly and/or dropwise can also facilitate the formation of the titanyl compound.

In a preferred embodiment, the titanyl compound is formed having a concentration greater than about 1.2M. At concentrations above about 1.2M, the titanyl compound is unlikely to precipitate or form $Ti(OH)_4$. This is true even if additional water is added to the titanyl compound, so long as the water is added after the titanyl compound has been formed. As discussed more fully below, the concentration of the titanyl compound is lowered below 1.2M to cause formation of titanium dioxide nanoparticles. Furthermore, formation of a stable titanyl compound can be advantageous for reacting the titanium compound with water and/or with a dispersing agent as discussed below.

In an exemplary embodiment, the reaction of a titanyl compound and water in concentrations greater than 1 molar equivalent forms hydroxy titanium compounds. For example, the reaction of water and titanyl chloride form a hydroxy titanium compound, as shown in the following reaction: $TiOCl_2 + H_2O \rightarrow TiO(OH)_2 + 2HCl$.

This reaction, unlike the reaction of $TiCl_4$, does not depend on the rate at which the water is added. Water can be added in amounts greater than 1 molar equivalent without forming $Ti(OH)_4$.

In one embodiment, the aqueous titanium solution is formed substantially free of a monofunctional alcohol. Forming the aqueous titanium solution without a monofunctional alcohol can be advantageous to prevent unwanted interactions between the monofunctional alcohol and the aqueous titanium compounds. Monofunctional alcohols have the potential to bind with titanium and form monofunctional-alcohol titanium complexes that have different chemical properties than the titanium compounds of the present invention. For example, compounds of titanium with monofunctional alcohols are less reactive and therefore less likely to interact with the dispersing agent. The advantage of forming aqueous titanium compounds without a monofunctional alcohol is significantly diminished once the dispersing agent has been added. Once the dispersing agent is bonded to or otherwise interacting with the titanium compounds, a monofunctional alcohol is less likely to affect the dispersing agent-titanium interactions.

B. Precursor Solutions Comprising Titanium and a Dispersing Agent

A dispersing agent is added to the aqueous titanium compound to form a titanium precursor solution. The dispersing agent is selected to promote the formation of titanium nanoparticles that have a desired shape, size, and/or stability. The dispersing agent is added to the aqueous titanium solution in order that the dispersing agent can interact and complex with the titanium compounds in solution. This interaction or complexing can be through various mechanisms, including ionic bonding, covalent bonding, Van der Waals interaction/bonding, or hydrogen bonding.

Dispersing agents within the scope of the invention include a variety of organic molecules. To provide the bonding between the dispersing agent and the titanium compound, the dispersing agent molecules include one or more appropriate functional groups. Suitable functional groups for complexing the dispersing agent with the titanium compound include one or more of a hydroxyl, a carboxyl, an amine, a thiol, a sulfonic acid, a sulfonyl halide, an acyl halide, and combinations of these. The dispersing agent can be monofunctional, bifunctional, or polyfunctional.

Examples of suitable monofunctional dispersing agents include carboxylic acids such as formic acid and acetic acid, and other organic compounds containing a single functional groups selected from the above list. Useful bifunctional dispersing agents include diacids such as oxalic acid, malonic acid, maleic acid, and the like; dialcohols such as ethylene glycol, propylene glycol, 1,3-propanediol, and the like; and hydroxy acids such as glycolic acid, lactic acid, and the like. Useful polyfunctional dispersing agents include sugars such as glucose, polyfunctional carboxylic acids such as citric acid, hydroxy diacids, and the like.

Other useful dispersing agents include ethanolamine, mercaptoethanol, 2-mercaptoacetate, amino acids such as glycine and alanine, sulfonic acids such as sulfobenzyl alcohol and sulfobenzoic acid, and other sulfobenzyl compounds having amino and thiol functional groups.

The dispersing agent is typically added as an aqueous solution to the solution of the titanium compound. The dispersing agent can be added in any concentration to provide a final desired concentration of titanium and dispersing agent. As discussed more fully below, the amount of dispersing agent relative to titanium compound can be varied to control the average size of the titanium dioxide nanoparticles being formed.

While the dispersing agent is typically added after formation of the aqueous titanium compounds, the present invention is not so limited. In another embodiment, the dispersing agent is added at the same time as the aqueous titanium compound is being formed. For example, an aqueous solution of the dispersing agent can be used to react the inorganic titanium compound with water as described above.

Complexing the dispersing agent with the particular aqueous titanium compounds of the present invention can be advantageous because of the reactivity of the aqueous titanium compounds. The titanyl and hydroxy titanium compounds readily form complexes with the dispersing agent. An additional advantage is that when the titanyl and hydroxy titanium compounds are reacted with the dispersing agent, the by products formed are less likely to affect the formation of titanium dioxide nanoparticles as compared to formation of titanium dioxide nanoparticles using other titanium compounds. For example, formation of the precursor solution according to the methods of the present invention produces titanium solutions that have less salts than compositions made using organic titanium compounds as a starting reagent.

C. Formation of Precipitates of Titanium Dioxide Nanoparticles

Once the precursor solution is prepared, nanoparticles of oxides are formed by precipitation. Formation of titanium dioxide nanoparticles is controlled by solution conditions such as concentration of the titanium compound, concentration of the dispersing agent, solution temperature and/or pressure, and the length of time that the aqueous titanium solution is allowed to stand, among others.

Precipitation may occur spontaneously during a holding period, or it may be induced, for example by changes in the temperature of the liquid mixture. The dispersing agent in the precursor solution acts to modify the precipitation process so that the desired small and uniform nanoparticles are formed.

At present, it is believed that the preferred temperature is somewhat elevated above room temperature (e.g., 50-90° C.). Precipitation can be performed at higher temperatures, including temperatures about the boiling point of the liquid medium (e.g., greater than 100° C. for aqueous medium), although this would typically require that the precipitation be conducted under pressure to avoid boiling off the liquid medium. Precipitation at the boiling point of the medium can also be performed using a reflux condenser. Finally, precipitation at lower temperature, for example at room temperature or below, can be done, but typically requires extended holding periods.

Another technique for precipitating titanium dioxide nanoparticles includes holding the solution for periods at different temperatures. For example, the liquid mixture may be heated in a first step using thermal heat transfer or microwaves and then cooled in a second step, for example, by contacting with a cooling medium, or by submergence in a low temperature bath such as an ice bath. Heating steps of this type may be conducted in any order, and may be conducted with rapid heating or cooling, or with gradual heating or cooling.

The time required for formation of nanoparticles can vary broadly depending on the reaction conditions such as temperature, titanium concentration, and dispersing agent concentration. Typically the holding period is between nearly instantaneous to requiring a holding time of days. Methods that involved rapid changes in temperature will generally result in the most rapid particle formation.

In one particular embodiment of the present invention, a precursor solution comprising a titanyl compound is used to form titanium dioxide precipitates by controlling the concentration of the aqueous titanium compound. In a preferred embodiment, a titanyl compound is diluted to between about 0.2 and 1.2M. The solution is then held for between about 30 minutes and 10 days at between about 15° C. and 155° C. Holding the precursor solution at concentrations between 0.2M and 1.2M results in a large number of titanium dioxide nuclei that grow properly. Concentrations above 1.2M tend to prevent formation of the titanium dioxide nuclei. Concentrations below 0.2M tend to form numerous nuclei that either do not grow or grow improperly.

1. Suspensions of Titanium Dioxide Nanoparticles

To form nanoparticle suspensions, the titanium dioxide nanoparticles are precipitated in solution in a stable form or stabilized to prevent precipitation from the suspension.

The liquid suspension of nanoparticles may be used directly without further processing. For example, it may be applied directly to a surface to create a coating or thin film of nanoparticles, as appropriate, for certain end use applications. It may also be added as an ingredient to a formulation containing other materials as well, such as may be done in a personal care application such as sunscreen or the like.

If a significant period of time is to pass before use of the nanoparticle suspension, the suspension can be stored by lowering its temperature below 10° C., preferably to 0° C. or less. This serves to maintain stable average particle size and particle size distribution.

2. Titanium Dioxide Powders

In another embodiment of the present invention, the prepared nanoparticles may be recovered in dry form, such as in a fine powder. Any suitable method may be used for recovery of the nanoparticles, including filtration, centrifugation, flocculation, or the like. After recovery, the particles may be further treated. For example, the particles may be washed with water or an organic solvent.

3. Controlling Particle Size

In an exemplary embodiment, the titanium dioxide nanoparticles of the present invention have a controlled average particle size of between about 2 nm to about 200 nm. According to one method of the present invention, the average particle size can be selected by controlling the ratio of titanium compound to dispersing agent molecules. The molar ratio of titanium compound to dispersing agent molecules is varied between about 0.01 to about 100 and more preferably between about 0.05 to about 20. Within these ranges, the final average particle size can be varied between about 2 nm and about 200 nm. In general, the final average particle size increases with an increase in the ratio of Ti to dispersing agent molecules.

Examples 2-9 below illustrate particular ratios of titanium to functional groups that generate desired particle sizes. FIGS. 2-9 are high resolution transmission electron microscopy (TEM) and laser light scattering graphs of titanium nanoparticles of respective examples 2-9. For purposes of this invention, the particle size is measured by the average particle size.

Example 1 was used to make titanium dioxide nanoparticles according to the prior art and is provided for comparative purposes. FIG. 1 is a TEM of the nanoparticles made according to the prior art Example 1. As shown in FIG. 1, the prior art methods produce titanium dioxide nanoparticles with an average size of about 3-4 nm.

COMPARATIVE EXAMPLE 1

100 g or 57.94 ml of titanium tetrachloride was chilled in a freezer overnight and placed in a 1000 ml flask. To this, 350 ml of deionized ice water was added drop-wise while continuously shaking the flask. The reaction was very exothermic and produced a white smoke (anhydrous HCl). The reaction produced an aqueous titanyl chloride with greater than 1.2M titanyl chloride.

The titanyl chloride solution was then added drop-wise to 350 ml of deionized water while stirring. This step produced a precursor solution having 0.7M titanyl. The precursor solution was then allowed to stand overnight at 50° C. and precipitates formed. The precipitates were filtered using a 25 nm filter and a pressure filtration unit and then washed with water and methanol

EXAMPLE 2

100 g or 57.94 ml of titanium tetrachloride was chilled in a freezer overnight and placed in a 1000 ml flask. To this, 350 ml of deionized ice water was added drop-wise while continuously shaking the flask. The reaction was very exothermic and produced a white smoke (anhydrous HCl). The reaction produced an aqueous titanyl chloride with greater than 1.2M titanyl chloride.

The titanyl chloride solution was then added drop-wise to a solution of (15.27 ml glycolic acid (70%) and 334.73 ml of deionized water) while stirring to form a precursor solution having 0.7M titanyl. The precursor solution was then allowed to stand for 3 days at 70° C. until white precipitates formed. The precipitates were filtered using a 25 nm filter and a pressure filtration unit and then washed with water.

Figure 2:
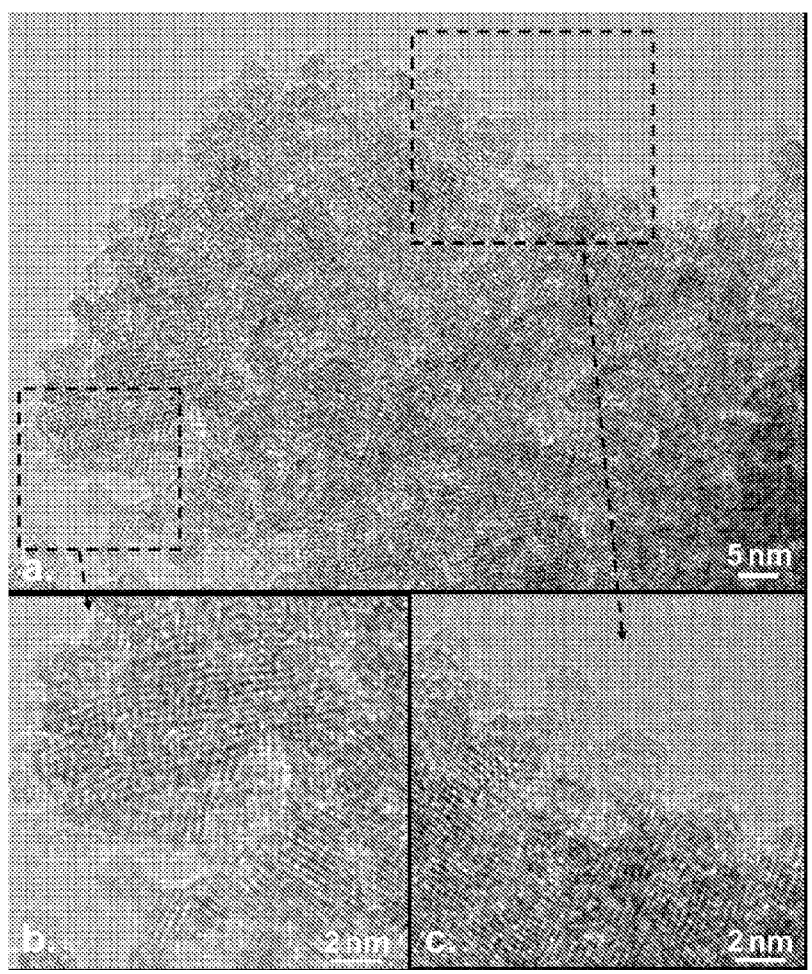
FIG. 2 is a high resolution transmission electron microscopy showing the size and shape of titanium dioxide nanoparticles made using an exemplary method of the present invention.

As shown in the TEM of FIG. 2, small nanoparticles between about 2-3 nm were formed using the method of Example 2. As compared to prior art nanoparticles of Example 1, the nanoparticles of the present invention show a smaller particle size distribution and much higher crystallinity and uniformity. A comparison of FIGS. 1 and 2 illustrate the improved crystallinity and uniformity of the nanoparticles the present invention.

EXAMPLE 3

Titanium dioxide nanoparticles according to the present invention were prepared using the same procedure as Example 2, except that the titanyl solution was added to a solution of 4.58 ml glycolic acid (70%) and 345.42 ml of deionized water to form a 0.7M precursor solution. The precursor solution was allowed to stand for 2 days at 70° C. until white precipitates formed. The precipitates were washed with water and ethanol.

Figure 3:
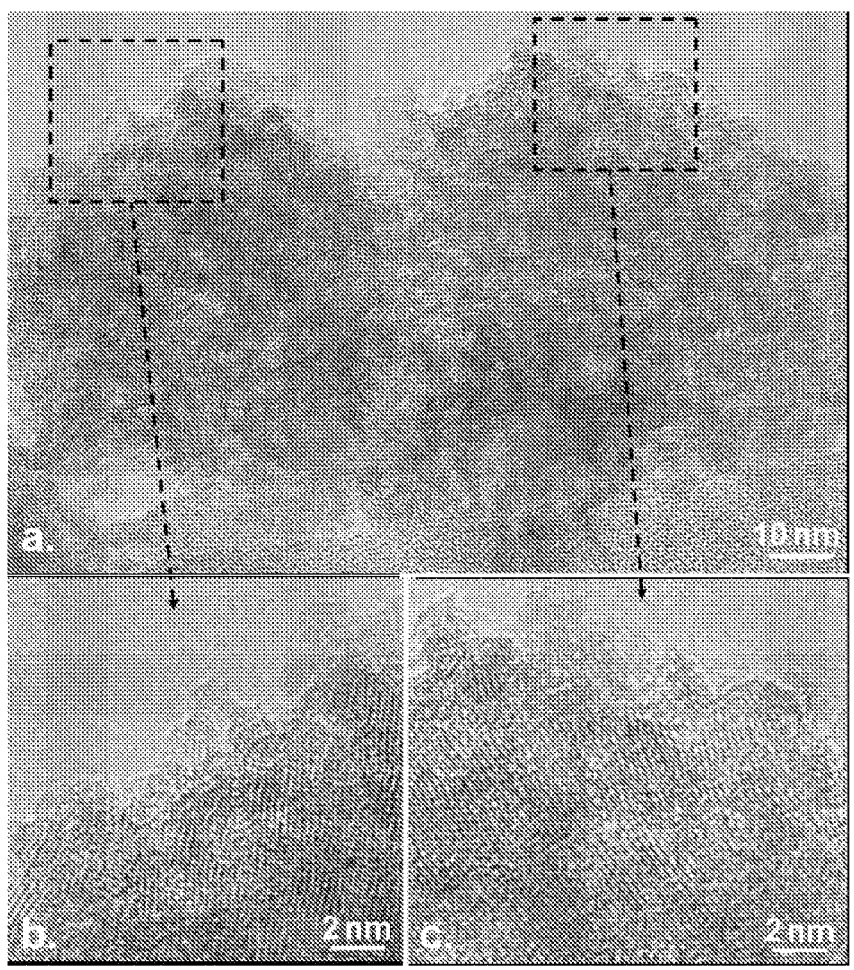
FIG. 3 is a high resolution transmission electron microscopy showing the size and shape of titanium dioxide nanoparticles made using another exemplary method of the present invention.

FIG. 3 is a TEM of the nanoparticles formed in Example 3. Even with reduced concentrations of glycolic acid and washing with ethanol, the nanoparticles are highly crystalline and uniform.

Examples 4-9 are examples of titanium dioxide nanoparticle suspensions. The size of the nanoparticles in suspension was controlled by varying the ratio of titanium to dispersing agent functional groups. The size of the particle was measured by laser light scattering.

EXAMPLE 4

Preparation of 10 nm $TiO_2$ Particles 50 ml of titanium tetrachloride was chilled in a freezer and placed in a 1000 ml flask, which is placed in an ice bath. To this, icy deionized water was added dropwise until a total volume of 335 ml was reached, while continuously shaking the flask. This reaction produced an aqueous titanyl chloride having a concentration of about 1.35 M.

2.46 g of 70% glycolic acid was diluted to 50 ml and added to 50 ml of the above titanyl chloride solution. This step gives an overall molar ratio of glycolic acid to titanium of 1:3. The mixture was placed into 1.35 kW microwave and irradiated for 2 minutes and 40 seconds. The resulting solution was poured into a beaker with 50 g ice. Finally the solution was placed into a freezer for 3 hrs to form a suspension of titanium dioxide nanoparticles.

Figure 4:
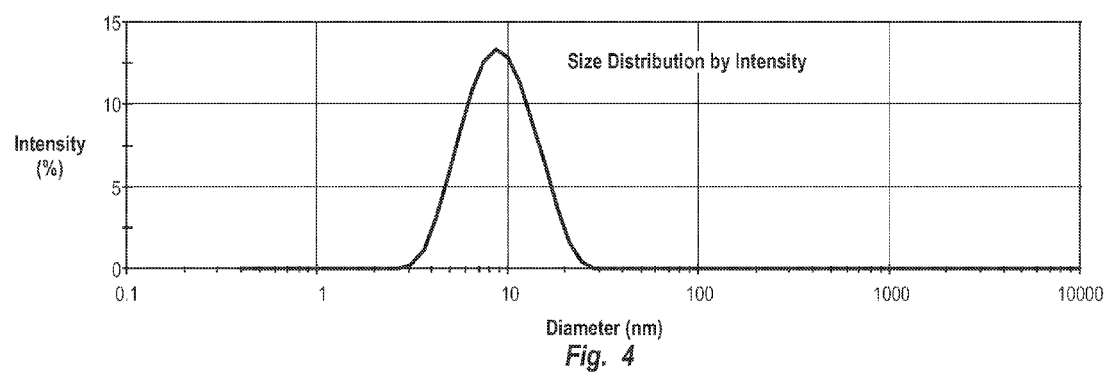
FIG. 4 is a graph of laser light scattering data showing the particle size distribution of the titanium dioxide nanoparticles formed according to Example 4.

The titanium dioxide suspension measured by dynamic laser light scattering technique and results are shown in FIG. 4. According to this test, the average particle size is 9.6 nm with the range being 3.1~24.4 nm.

EXAMPLE 5

Preparation of 150 nm $TiO_2$ Particles 100 g or 57.94 ml of titanium tetrachloride was chilled in a freezer and placed in a 1000 ml flask, which was placed in an ice bath. To this, 350 ml of deionized ice water was added dropwise, while continuously shaking the flask to form an aqueous titanyl chloride solution with a titanium concentration greater than about 1.5M.

The titanyl chloride solution was added dropwise to a solution of 7.64 ml glycolic acid (70 wt %) and 350 ml deionized water, while stirring. This solution had an overall molar ratio of glycolic acid to titanium of 1:6 and a titanium concentration of about 0.7M. The above mixture was then placed into water bath at 40° C. until a cloudy white suspension formed.

Figure 5:
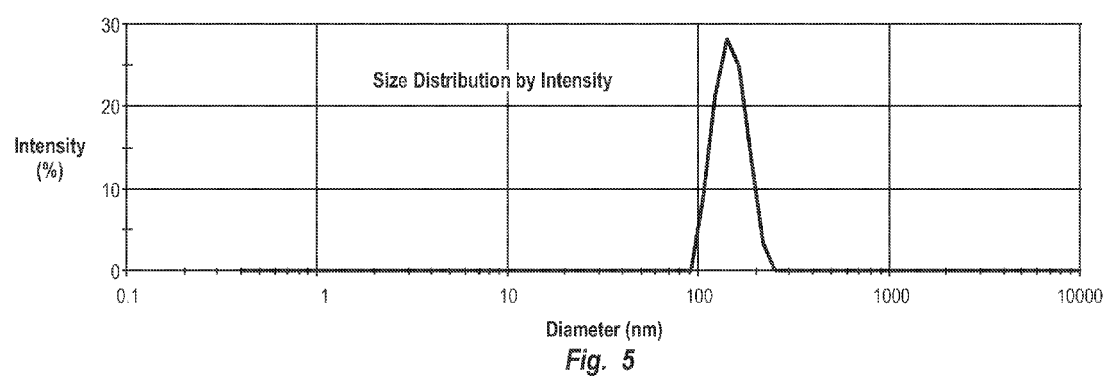
FIG. 5 is a graph of laser light scattering data showing the particle size distribution of the titanium dioxide nanoparticles formed according to Example 5.

The suspension was measured by dynamic laser light scattering and the results are shown in FIG. 5. According to this test, the average particle size was 149.3 nm with the range of 105.7-220.2 nm.

EXAMPLE 6

Preparation of 16 nm $TiO_2$ Particles 100 g or 57.94 ml of titanium tetrachloride chilled in a freezer overnight was placed in a 1000 ml flask, which was placed in an ice bath. To this, 350 ml of deionized ice water was added dropwise while continuously shaking the flask to form an aqueous titanyl chloride solution with a titanium concentration greater than about 1.2M.

The titanyl chloride solution was then added dropwise to a solution of 10.13 g citric acid and 350 ml deionized water, while stirring. This gives an overall molar ratio of citric acid to titanium of 1:10 and a titanium concentration of about 0.7M. This mixture was then placed into water bath at 70° C. until cloudy white suspension formed.

Figure 6:
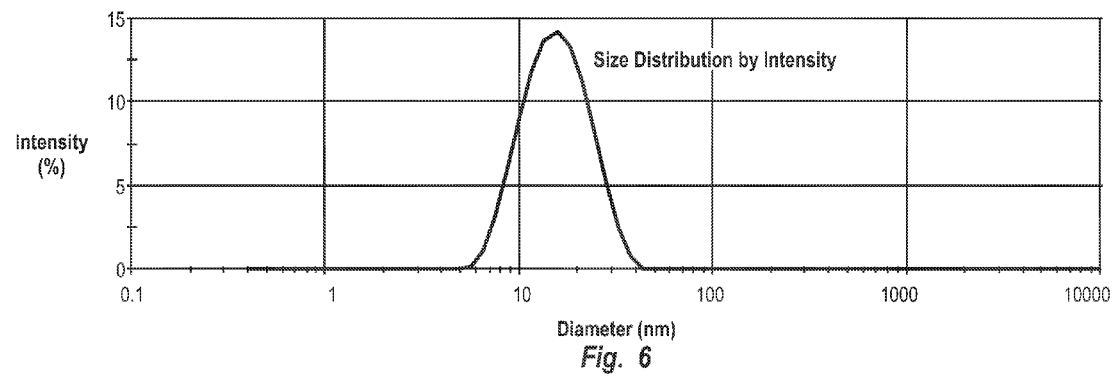
FIG. 6 is a graph of laser light scattering data showing the particle size distribution of the titanium dioxide nanoparticles formed according to Example 6.

The suspension was measured by dynamic laser light scattering and the results are shown in FIG. 6. According to this test, the average particle size was 16.5 nm with the range of 6~38 nm.

EXAMPLE 7

Preparation of 18 nm $TiO_2$ Particles Using Glycine 286 g of titanium tetrachloride was chilled in a freezer overnight and placed in a 2000 ml flask, which is placed in an ice bath. 1068 g of ice was added to the $TiCl_4$ slowly with continuous stirring. The above product was an aqueous titanyl chloride solution with a titanium concentration of about 1.35M.

Figure 7:
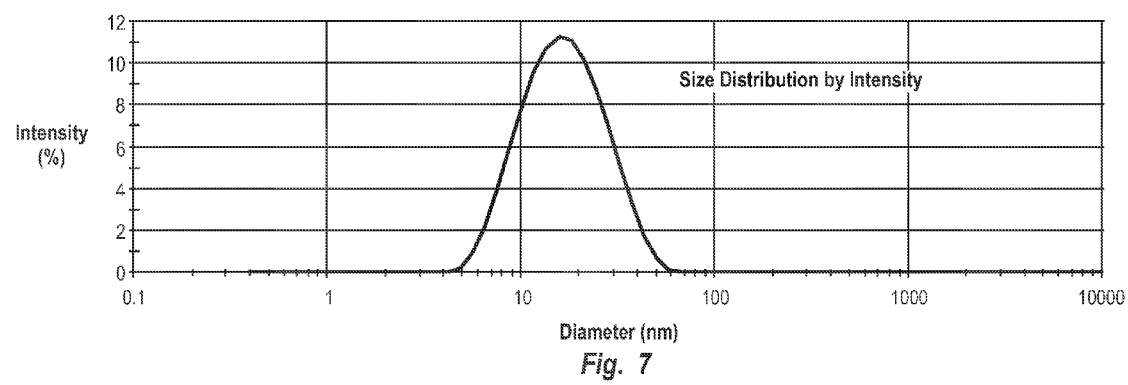
FIG. 7 is a graph of laser light scattering data showing the particle size distribution of the titanium dioxide nanoparticles formed according to Example 7.

1.69 g of glycine was dissolved in 50 ml of water and then added to 50 ml of the above 1.35M Ti solution to produce a 0.67M Ti solution. This gives a Ti to dispersing agent molecule ratio of 3:1. This 0.67 M Ti solution was then heated in a microwave oven at 1.35 kW for 1 minute and 45 seconds, and then added to 50 g of ice quickly. White $TiO_2$ precipitates in suspension were formed. The average titanium dioxide particle size was 18.4 nm with a range of about 5 nm to 59 nm. The particle size distribution as obtained by dynamic laser light scattering is shown in FIG. 7.

EXAMPLE 8

Figure 8:
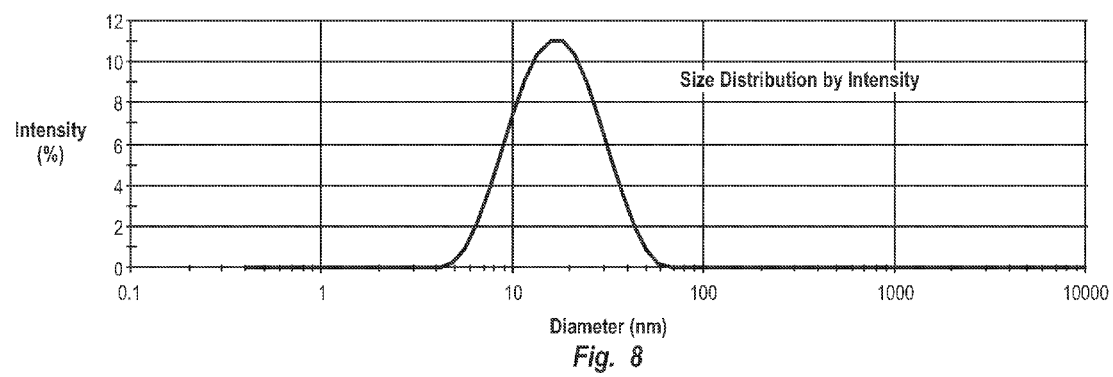
FIG. 8 is a graph of laser light scattering data showing the particle size distribution of the titanium dioxide nanoparticles formed according to Example 8.

Preparation of 19 nm $TiO_2$ Particles Using L-Alanine 2.00 g of L-alanine was dissolved in 50 ml of water and then added to 50 ml of the same 1.35M Ti solution as prepared in Example 7, resulting in a 0.67M Ti solution. This gives a Ti to dispersing agent molecule ratio of 3:1. This 0.67 M Ti solution was heated in a microwave oven at 1.35 kW for 1 minute and 45 seconds, and then added to 50 g of ice quickly. A suspension of titanium dioxide particles formed. The average size was 18.8 nm and the range of size was from about 5 nm to about 59 nm. The particle size distribution obtained by dynamic laser light scattering is shown in FIG. 8.

EXAMPLE 9

Figure 9:
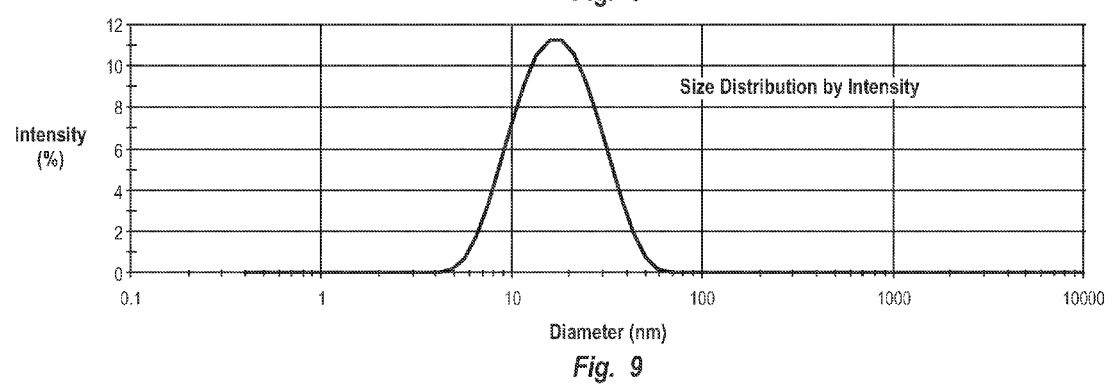
FIG. 9 is a graph of laser light scattering data showing the particle size distribution of the titanium dioxide nanoparticles formed according to Example 9.

Preparation of 19 nm $TiO_2$ Particles Using β-Alanine 2.00 g of β-alanine was dissolved in 50 ml of water, then added to 50 ml of the 1.35M Ti solution prepared in Example 7, resulting in a 0.67M Ti solution. This gives a Ti to dispersing agent molecule ratio of 3:1. This 0.67 M Ti solution was heated in a microwave oven at 1.35 kW for 1 minute and 45 seconds, and then added to 50 g of ice quickly. White precipitates formed having an average size of about 19 nm ranging from about 5 nm to about 59 nm. The particle size distribution as obtained by dynamic laser light scattering is shown in FIG. 9.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A suspension of stabilized titanium dioxide nanoparticles, comprising:
   a solvent substantially free of a monofunctional alcohol;
   a dispersing agent comprising a plurality of organic molecules that have at least one functional group selected from the group consisting of a hydroxyl, a carboxyl, a carbonyl, an amide, an amine, a thiol, a sulfonic acid, sulfonyl halide, an acyl halide, and combinations thereof; and
   a plurality of titanium dioxide nanoparticles dispersed in the solvent to form a suspension of nanoparticles stabilized by the dispersing agent,
   wherein the titanium dioxide nanoparticles have a particle size of up to 200 nm.

2. A suspension of stabilized titanium dioxide nanoparticles as in claim 1, wherein the organic molecules of the dispersing agent comprise at least two different functional groups selected from the group consisting of hydroxyl, carboxyl, carbonyl, amide, amine, thiol, sulfonic acid, sulfonyl halide.

3. A suspension of stabilized titanium dioxide nanoparticles as in claim 1, wherein the dispersing agent comprises at least one type of organic molecules selected from the group consisting of glycolic acid, glycine, L-alanine, and β-alanine.

4. A suspension of stabilized titanium dioxide nanoparticles as in claim 1, wherein the titanium dioxide nanoparticles have a particle size of up to 100 nm.

5. A suspension of stabilized titanium dioxide nanoparticles as in claim 1, wherein the titanium dioxide nanoparticles have a particle size of up to about 20 nm.

6. A suspension of stabilized titanium dioxide nanoparticles as in claim 1, wherein the titanium dioxide nanoparticles have a particle size of up to 4 nm.

7. A suspension of stabilized titanium dioxide nanoparticles as in claim 1, wherein the suspension has a temperature less than about 10° C. so as to have increased stability over time.

8. A suspension of stabilized titanium dioxide nanoparticles as in claim 1, wherein the suspension has a temperature less than about 0° C. so as to have increased stability over time.

9. A suspension of stabilized titanium dioxide nanoparticles, comprising:
   a solvent;
   a dispersing agent comprising a plurality of organic molecules selected from the group consisting of glycolic acid, glycine, L-alanine, and β-alanine; and
   a plurality of titanium dioxide nanoparticles dispersed in the solvent to form a suspension of nanoparticles stabilized by the dispersing agent,
   wherein the titanium dioxide nanoparticles have a particle size of up to 200 nm.

10. A suspension of stabilized titanium dioxide nanoparticles as in claim 9, wherein the titanium dioxide nanoparticles have a particle size of up to 100 nm.

11. A suspension of stabilized titanium dioxide nanoparticles as in claim 9, wherein the titanium dioxide nanoparticles have a particle size of up to about 20 nm.

12. A suspension of stabilized titanium dioxide nanoparticles as in claim 9, wherein the suspension has a temperature less than about 10° C. so as to have increased stability over time.

13. A suspension of stabilized titanium dioxide nanoparticles as in claim 9, wherein the suspension has a temperature less than about 0° C. so as to have increased stability over time.

14. A suspension of stabilized titanium dioxide nanoparticles of controlled particle size manufactured according to a method comprising:
   (i) reacting an inorganic titanium compound with water to form an aqueous titanium solution;
   (ii) adding an amount of a dispersing agent to the aqueous titanium solution to form a precursor solution, wherein the dispersing agent comprises plurality of organic molecules that have at least one functional group capable binding to titanium in the aqueous solution;
   (iii) forming a suspension of titanium dioxide nanoparticles having a particle size up to 200 nm by holding the precursor solution at one or more temperatures in a range of about 15° C. to about 155° C. until form out the precursor solution in the presence of the dispersing agent; and
   (iv) cooling the suspension of titanium dioxide nanoparticles to a temperature below the one or more temperatures to yield a suspension of stabilized titanium dioxide nanoparticles of controlled particle size, the dispersing agent further stabilizing the titanium dioxide nanoparticles.

15. A suspension of stabilized titanium dioxide nanoparticles as in claim 14, wherein the at least one functional group is selected from the group consisting of a hydroxyl, a carboxyl, a carbonyl, an amide, an amine, halide, an acyl halide, and combinations thereof.

16. A suspension of stabilized titanium dioxide nanoparticles as in claim 14, wherein the dispersing agent comprises at least one type of organic molecules selected from the group consisting of glycolic acid, glycine, L-alanine, and β-alanine.

17. A suspension of stabilized titanium dioxide nanoparticles as in claim 14, wherein the inorganic titanium compound is reacted in (i) with water at about 0° C. and/or with ice.

18. A suspension of stabilized titanium dioxide nanoparticles as in claim 14, wherein the suspension of titanium dioxide nanoparticles is cooled in (iv) to a temperature less about 10° C.

19. A suspension of stabilized titanium dioxide nanoparticles as in claim 14, wherein the suspension of titanium dioxide nanoparticles is cooled in (iv) to a temperature less about 0° C.

20. A suspension of stabilized titanium dioxide nanoparticles as in claim 14, wherein the dispersing agent is added to the titanium solution in (ii) in a ratio of titanium atoms to functional groups of about 0.01 to about 100 so that that titanium dioxide nanoparticles are formed in (iii) having a size between about 2 nm and 200 nm.

* * * * *

UNITED STATES PATENT AND TRADEMARK OFFICE
CERTIFICATE OF CORRECTION

PATENT NO.         : 7,344,591 B2
APPLICATION NO. : 11/743528
DATED                  : March 18, 2008
INVENTOR(S)        : Zhou et al.

It is certified that error appears in the above-identified patent and that said Letters Patent is hereby corrected as shown below:

Title Page
Page 2, Column 2, OTHER PUBLICATIONS

Publication #4, Zhou et al. change "Eectrocatalyst" to --Electrocatalyst--
Publication #5, Zhou et al. remove "2003, pp. 885-862." after --862--

Column 1
Line 24, change "microbial" to --microbials--

Column 9
Line 12, change "which is placed" to --which was placed--

Column 10
Line 11, change "which is placed" to --which was placed--

Column 11
Line 21, change "halide." to --halide, and acyl halide.--

Column 12
Line 18, change "capable binding" to --capable of binding--
Line 22, change "until form out" to --until the nanoparticles form out of--
Line 34, change "an amine, halide," to --an amine, a thiol, a sulfonic acid, sulfonyl halide,--
Line 47, change "temperature less" to --temperature less than--
Line 51, change "temperature less" to --temperature less than--
Line 56, change "so that that" to --so that the--

Signed and Sealed this

Eighth Day of December, 2009

David J. Kappos
*Director of the United States Patent and Trademark Office*